Aug. 23, 1938. T. SCHMIDT 2,128,166
CENTRIFUGAL SEPARATOR
Filed Sept. 3, 1935 2 Sheets-Sheet 2
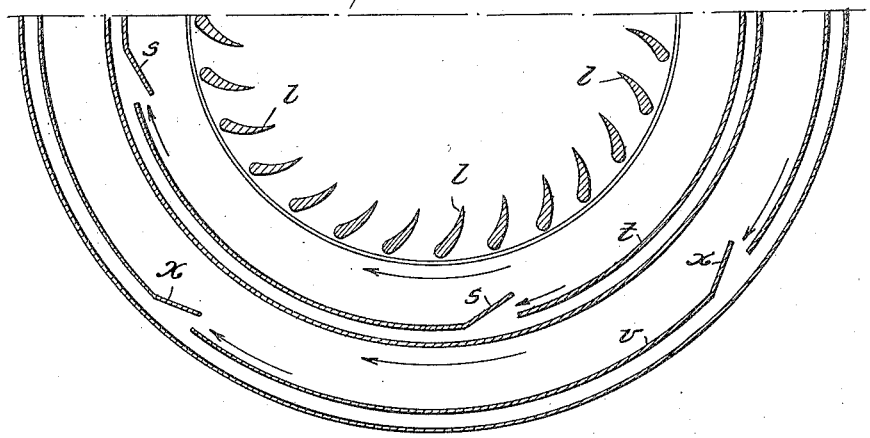
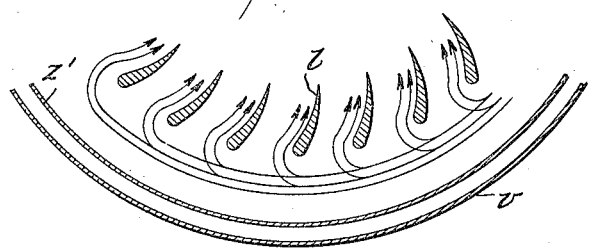
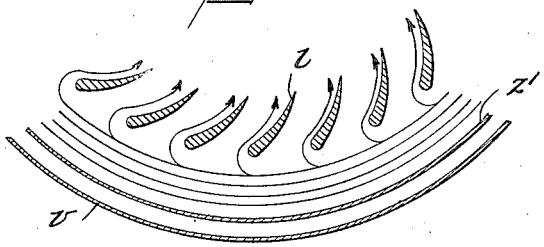
Inventor
Theo Schmidt
By Watson, Cit, Leorse & Friedle
Attorney Patented Aug. 23, 1938

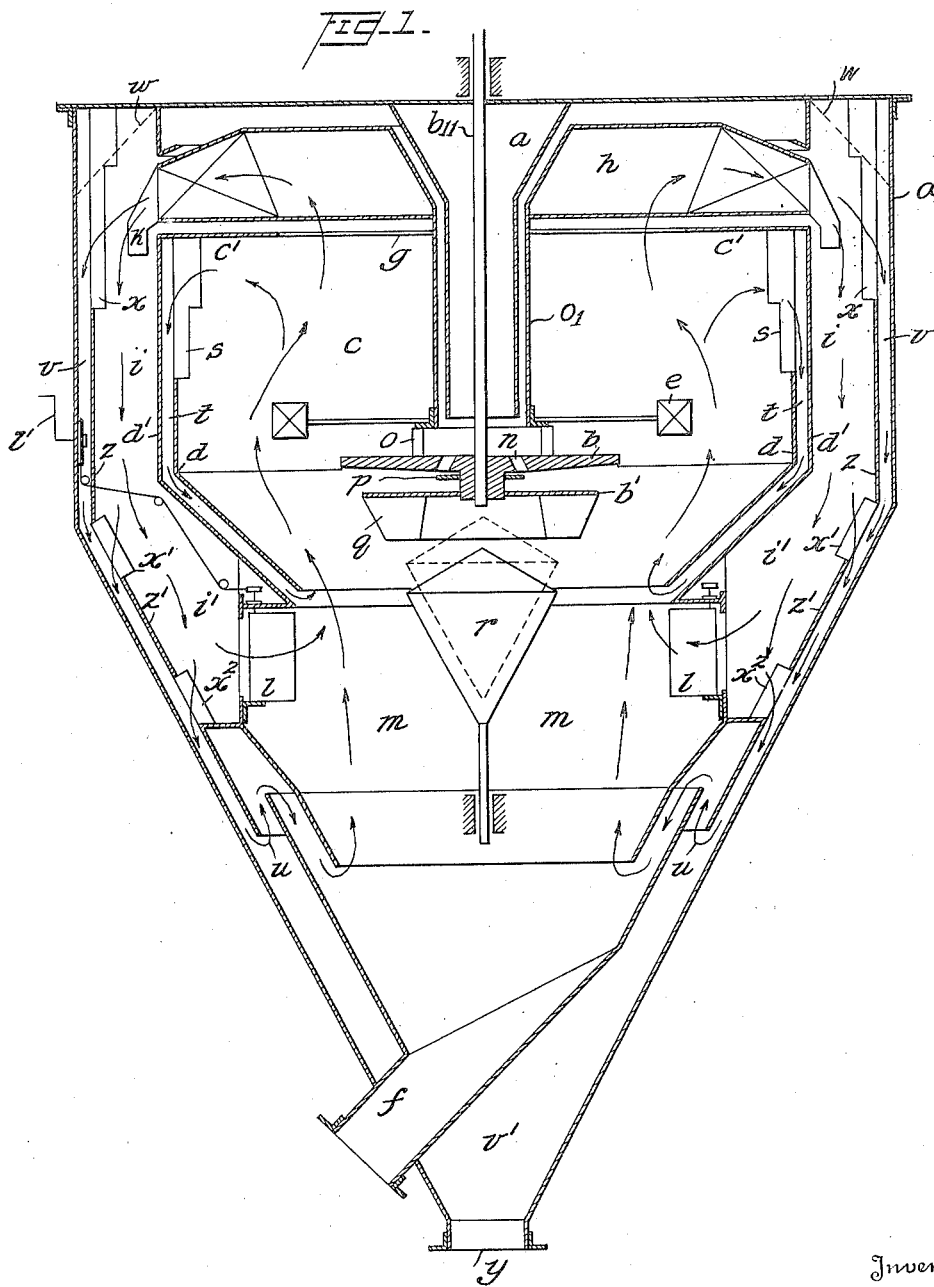

2,128,166

UNITED STATES PATENT OFFICE 2,128,166

CENTRIFUGAL SEPARATOR

Theo Schmidt, Dortmund, Germany, assignor to G. Polysius, Aktiengesellschaft, Dessau, Germany Application September 3, 1935, Serial No. 38,879½
In Germany September 13, 1934

9 Claims. (Cl. 209—139)

This invention relates to centrifugal separators and has for its object the provision of a method and apparatus for separating and classifying finely divided or pulverulent solid material, for instance coal dust, cement, lime, or the like.

It has been previously proposed to effect separation and classification of such material by blowing air laden with the material into a closed chamber in such manner as to cause the air to follow a generally circular path in the upper portion of the chamber, whereby the heavier particles of the material are thrown toward the outer walls of the chamber by centrifugal force, dropped downwardly along the walls, and are discharged from the chamber. It is found, however, that in practice this principle of operation is not satisfactory since the separation of the suspended particles of different degrees of fineness is slight and efforts have been made to improve the action by the use of baffles and the like which are interposed in the path of movement of the circulating dust laden air in order that the generally circular movement of the particles may be retarded and downward movement thereof facilitated. Unfortunately, baffles of this character do not increase the efficiency of operation since they tend to restrict and retard the circulation of air and to cause powerful eddy formations, the eddies being of a cyclonic nature and serving to directly agitate the dust or solid particles which have accumulated on the outer wall of the chamber. These particles being thus placed once more in suspension in the air, the centrifugal action is partly nullified.

It has now been discovered as the result of exhaustive experiments that the efficiency of centrifugal separators of this character may be greatly increased by the elimination of conventional baffles and by the use in lieu thereof of means for stripping or scaling the dense dust-bearing strata adjacent the periphery of the path of movement of the circulating air and it is therefore a feature of the present invention that the separating apparatus is provided with means for withdrawing this outer strata of air and discharging the same, together with the highly condensed dust particles, through segregated passages.

A more specific object of the invention is the provision of apparatus for separating and/or classifying solid particles in the form of dust or the like which comprises a chamber having means for circulating air therein in a curved path, means for saturating the circulating air with the dust to form a suspension of the latter, and means for diverting the peripheral portion only of the saturated circulating air from the chamber and discharging the dust from the diverted mixture. In the preferred form of the invention the chamber is generally cylindrical and the saturated air is caused to follow a generally spiral path, moving about the walls of the chamber and upwardly in the chamber. By means of this construction the heavier particles will be thrown outwardly at a lower point than the lighter particles, the latter rising with the ascending air, and the outermost strata of air are removed at both the lower and the upper points, isolated from the main portion of the chamber, and gradually retarded so that the particles may separate out, discharge of the lighter and heavier particles being effected at different points.

The invention further comprises the employment of means for adjustably controlling the movement of the air within the chamber, both as to volume and direction, and this means is preferably located outside of the principal zones of saturation and separation so that undesirable eddying of dust laden air is reduced to a minimum.

Further objects and features of the invention will be apparent from the following description taken in connection with the accompanying drawings, in which Figure 1 is a vertical sectional view, diagrammatic in nature, of apparatus embodying the principles of the invention;

Figure 2 is a horizontal sectional view illustrating diagrammatically the mode of operation of the air control means, the direction of circulation of air within the apparatus, and the manner in which the outer strata of heavily saturated air are withdrawn; and Figures 3 and 4 are partial horizontal sectional views illustrating more particularly the effect of the air control means.

For convenience in describing the invention, reference is made to the preferred embodiment thereof illustrated in the accompanying drawings and specific language is used. It will nevertheless be understood that no limitation of the scope of the invention is thereby intended and that various modifications and alterations of the illustrated structure are contemplated such as would occur to one skilled in the art to which the invention relates.

As shown in Figure 1 of the drawings, the apparatus comprises an exterior housing $a_1$ which is preferably closed with the exception of the inlet conduit $a$ and the discharge conduits $f$ and $y$, the housing having a generally cylindrical upper portion and a generally conical, downwardly tapering lower portion. A housing $d$, $d_1$ of generally similar shape is located within the main housing and serves to divide the latter into an upper dust saturating chamber $c$ and a sifting chamber $m$, the housing $d$, $d_1$ also forming additional dust separating chambers $i$ and $i_1$ of which the function will be more particularly described hereinafter.

The material undergoing treatment is fed into the chamber through the inlet conduit $a$ onto a rotating plate $b$ which is supported on a shaft $b_{11}$ extending through the conduit $a$, any conventional means being provided to impart rotation to the shaft $b_{11}$ to thereby drive the plate $b$. The plate $b$ may be provided with one or more openings $n$, the size of these openings being adjustable by means of a collar $p$ which is provided with a notched peripheral portion, the collar $p$ being rotatable on a boss extending downwardly from the plate $b$, whereby the notches in the collar may be brought into greater or less register with the openings $n$.

Immediately below the plate $b$ and secured thereto for rotation is a second plate $b_1$ which is arranged to receive any material which may fall through the openings $n$ in the plate $b$. It will be appreciated that these plates serve to distribute the material passing through the inlet conduit $a$, such material being thrown radially outward of the plates by centrifugal force for suspension in the air flowing upwardly into the saturating chamber $c$, the use of two plates affording more rapid and uniform distribution of material.

Downwardly extending blades $q$ are formed on or secured to the underside of the plate $b_1$, these blades constituting a blower for directing circulating air outwardly and upwardly in the chamber $c$, a baffle $r$ having a generally cone shaped upper surface being positioned immediately beneath the blower $q$ and being adjustable by any conventional means, extending outside the apparatus, upwardly or downwardly as indicated in full and dotted lines in Figure 1 of the drawings, whereby the direction and volume of air discharged by the blower $q$ may be readily controlled.

The rotating distributing plate $b$ is provided on its upper surface with an upwardly directed annular support $o$ on which is carried a plurality of radially extending arms, each of which supports a blade $e$, these blades serving to promote the rotary movement of the ascending air in the saturating chamber $c$. The support $o$ also carries an upwardly directed sleeve $o_1$ at the upper end of which is mounted a plurality of generally radially directed blades $h$ having outwardly and downwardly projecting portions $k$, the blades $h$ constituting a suction device for drawing the circulating air upwardly from the chamber $c$ and discharging it downwardly through the annular chambers $i$ and $i_1$, the direction of air flow being indicated by arrows in Figures 1 and 2 from which it is apparent that the air follows an upward helical or spiral path as the result of the combined action of the blower $q$, the suction device $h$, the rotating blades $e$, and the configuration of the walls which define the saturating chamber $c$.

Air discharged by the suction device $h$ flows downwardly in the chambers $i$ and $i_1$, is caused to pass between the adjustable blades $l$ in such manner that the direction of rotation of the air about the vertical axis of the apparatus is reversed to a greater or less extent, the air passing through the blades $l$ being then diverted back into the main upwardly ascending spiral stream. The blades $l$ are preferably so shaped in cross-section, as shown more particularly in Figures 3 and 4, as to avoid the formation of undesirable eddies, being of generally stream-lined design. Adjustment of the blades $l$ may be effected from the exterior of the apparatus by means of a crank $h_1$, this crank being connected through a pulley and belt system with the individual blades, each of the blades being supported for rotation on a generally vertical axis.

Devices are provided at various points in the apparatus for separating and segregating the denser or more saturated air and diverting it through channels isolated from the remainder. Thus the housing $d$, $d_1$ may be formed as illustrated in Figure 1 of the drawings of two generally concentric walls forming therebetween an annular passage $t$. The inner wall $d$ of the housing may be broken at intervals spaced in a circumferential direction and extended inwardly to afford vanes $s$ projecting into the peripheral portion of the rotating air to effect removal therefrom of the outermost strata as shown in Figure 2. The saturated air containing the highly condensed dust which is thus diverted from the main stream flows downwardly through the annular passage $t$ and is discharged into the separating chamber $m$, it being observed that the restricted nature of the passage $t$ will serve to retard movement of the air and facilitate separation of the dust therefrom.

The vanes $s$ are preferably larger at the upper than the lower portions so as to extend further into the column of ascending and rotating air and to afford larger openings, thus facilitating the removal of material from the less rapidly rotating portion of the air circulating within the saturating chamber $c$.

Obviously other devices may be employed as a substitute for the vanes $s$ to effect stripping or scaling of the outer strata of circulating air, but it is preferred that the construction be such as to afford minimum resistance to the circulatory movement of the air within the chamber $c$.

A wall $z$, preferably conforming closely to the contour of the outer housing $a_1$ forms therewith an annular passage $v$ defining the periphery of the chambers $i$ and $i_1$. As the air discharged from the suction device $h$ passes downwardly through these chambers, the outer peripheral portion of the air, which is now moving in a generally circular downwardly directed path, is diverted by one or more separating or stripping devices, the vanes $x$, $x_1$, and $x_2$ of these devices being illustrated in Figure 1 of the drawings. Each of these devices serves to divert the denser portion of the air and to direct the same downwardly through the annular passage $v$, the function of these vanes being similar to the function of the vanes $s$.

At its lower end the passage $v$ discharges into the lower end $v_1$ of the conical portion of the outer housing, the air moving downwardly through the passage $v$ being diverted as indicated at $u$ about the upper end of a generally conical partition $u_1$, the partition $u_1$ terminating at its lower end in the discharge spout $f$. Air flowing downwardly through the chamber $i_1$ and not diverted into the passage $v$, passes through the blades $l$ and is thus returned to the saturating chamber $c$.

The operation of the device thus far described will be apparent. Material discharged radially from the plates $b$ and $b_1$ is mixed with and suspended in the rising current of air and as the result of the rapid rotation of which the air partakes, heavier particles are thrown out by the action of centrifugal force and accumulate in the outer strata of the ascending helix or spiral of air and are diverted from the saturating chamber $c$ by the vanes $s$. This diverted and highly condensed portion of the dust laden air flows downwardly through the annular passage $t$ and is discharged at the lower end into the separating chamber $m$, the air returning upwardly into the saturating chamber $c$. The principal portion of the material carried by this air is discharged downwardly in the chamber $m$ and through the spout $f$ by reason of the retardation of flow in the relatively restricted passage $t$ and by expansion of the air on emergence from the passage $t$ into the chamber $m$.

Particles of the suspended material of medium and extreme fineness are not diverted by the vanes $s$ but are carried upwardly through the suction device $h$ and pass downwardly through the chambers $i$ and $i_1$, the generally helical movement of the air being continued in this chamber with the result that the outer strata which is more heavily saturated with dust is stripped off by the vanes $x$ and flows down through the passage $v$. Additional stripping devices in the form of the vanes $x_1$ and $x_2$ in the chamber $i_1$ serve to remove the outer strata of air from this chamber, this air strata having now acquired the desired degree of dust concentration, and by reason of the restricted nature of the passage $v$, circulatory motion of the air is retarded with the result that upon expansion of the air at the point $u$ the finer dust is discharged into the lower end $v_1$ of the outer housing and thence through the outlet $y$.

Practically all solid material is removed from the air which emerges from the lower end of the chamber $i_1$, final separation being effected at the lower end of this chamber as the result of the retardation of flow of the air on the initiation of passage thereof between the blades $l$, the final discharge of dust laden air taking place past the vanes $x_2$ and through the lower end of the passage $v$. Thus the air which is returned for recirculation between the blades $l$ and upwardly toward the saturating chamber $c$ is substantially clean and free from dust.

By adjustment of the position of the blades $l$, the air passing therebetween may be throttled to a greater or less extent. Furthermore, control of the blades may be employed to suit the apparatus to the treatment of material of different character and density; for instance, the blades $l$ may be set so as to provide rotational movement of air within the separating chamber $m$, this being particularly desirable in the screening or separation of fairly coarse material. Since the direction of rotation of the air produced by the blades $l$ is ordinarily opposite to the direction of rotation of air elsewhere in the apparatus, such rotative movement may be substantially eliminated in the separating chamber $m$, if desired, by proper setting of the blades, the rotative effect produced by the blades nullifying the action of the blower $q$ and suction device $h$.

It will be noted that the various stripping or scaling vanes are disposed so as to extend above the principal air propulsion units. Thus the vanes $s$ are disposed above the blower $q$ and the blades $e$ and the vanes $x$ are disposed above and are extended at their upper ends toward a point directly over the depending portions $k$ of the blades $h$, the vanes $x$ thereby forming a special collecting member, indicated by the dotted lines at $w$, which is particularly effective in the withdrawal of very fine material from the circulating air.

The direction of rotation of the plates $b$ and $b_1$ and the associated blower and suction device is preferably that indicated by the arrows in Figure 2 of the drawings, these arrows showing the general direction of movement of the air about the axis of the apparatus in different portions thereof. The blades $l$ are preferably disposed so as to reverse the direction of rotation of the air as it enters the separating chamber $m$, the extent of reversal being radily controlled by manipulation of the blades as heretofore explained and as illustrated more particularly in Figures 3 and 4.

As is hereinbefore indicated, the various vanes $s$, $x$, $x_1$, and $x_2$, whereby stripping of the denser strata of air is effected, may be made adjustable so as to remove strata of varying thickness. For this purpose the vanes may be supported for swinging movement about generally vertical axes adjacent the openings with which they are associated. Thus a construction similar to that used in connection with the blades $l$ may be employed, and similar operating devices, which may be manipulated from the exterior of the apparatus, may be provided for controlling the position of the vanes.

While air will ordinarily be employed as the circulating medium in the apparatus hereinbefore described, it will be obvious that other fluid media may be employed if desired. All such media may be described for convenience as gases.

It will also be understood that while the arrangement particularly described herein has proven most efficient for the intended purpose, portions of the apparatus may be eliminated together with the functions which they perform. For instance, in the simplest form of apparatus embodying the principles of the present invention, only the first of the stripping or scaling devices, indicated at $s$, might be employed, or only the devices $s$ and $x$ might be provided, particularly where the more complete extraction of solid material from the gas is not necessary. Thus it is possible to extract the coarser portion of the solid matter from a suspension in gas by rotating the gaseous suspension, withdrawing a portion thereof from the periphery only, and in this manner effecting fairly efficient separation of the denser and the lighter particles of matter. Various other modifications of the structure and sundry uses of the apparatus will be apparent to those skilled in the art.

In certain of the appended claims the vanes $s$, $x$, $x_1$ and/or $x_2$ are referred to as "stationary" means extending into the path of the gas for diverting the outer peripheral strata of the gas. The use of the term "stationary" is intended to signify that the vanes or diverting means in question do not rotate or move about the axis of the separator, but the use of such term is not intended to restrict the claims so as to exclude vanes or gas diverting means which are adjustable angularly with respect to the adjacent chamber walls.

Having thus described the invention, what is claimed as new and desired to be secured by Letters Patent is:

1. In apparatus for separating solid material from suspension in a gas, a double-walled housing, a second double-walled housing surrounding said first housing, means for effecting movement of the material laden gas upwardly through said first housing in a generally helical path, thence downwardly between said housings in a generally helical path, stationary means extending into the path of the gas for diverting the outer peripheral strata of the gas within said first housing to the space between the walls of said housing, and stationary means extending into the path of the gas for diverting the outer peripheral strata of the gas between said housings to the space between the walls of said second housing.

2. In apparatus for separating solid material from suspension in a gas, a housing, a second housing surrounding said first housing and spaced therefrom, means for passing the material laden gas upwardly through said first housing in a generally helical path and downwardly in the space between said housings in a generally helical path, a constricted chamber associated with said first housing, means for diverting the outer peripheral strata of said gas into said constricted chamber, a constricted chamber associated with said second housing, and means for diverting the outer peripheral strata of the remaining gas into said second constricted chamber, said gas diverting means comprising vanes projecting into the outer peripheral strata of the gas within the respective housings.

3. In apparatus for separating solid material from suspension in a gas, a housing, a second housing surrounding said first housing and spaced therefrom, means for passing the material laden gas upwardly through said first housing in a generally helical path and downwardly in the space between said housings in a generally helical path, a constricted chamber associated with said first housing, means, including stationary vanes extending into the path of the gas adjacent the top of said first housing, for diverting the outer peripheral strata of the gas into said constricted chamber, a constricted chamber associated with said second housing, and means, including stationary vanes extending into the path of the gas at a plurality of levels, for diverting successive peripheral strata of said gas into said second constricted chamber.

4. In apparatus for classifying and separating divided solid materials, a housing, a second housing surrounding said first housing and spaced therefrom, impelling means for passing a current of gas upwardly in a generally helical path within said first housing, means for distributing solid material in said current of gas, means separate from said impelling means for assisting the rotary motion of the material laden gas, a constricted chamber associated with said first housing, stationary means extending into the path of the gas at a point adjacent the top of said first housing for diverting the outer peripheral strata of said gas into said constricted chamber, means above the top of said first housing for withdrawing the remainder of said gas therefrom and passing said gas downwardly in a generally helical path within the space between said housings, a constricted chamber associated with said second housing, and stationary means extending into the path of said gas for diverting the outer peripheral strata thereof into said second constricted chamber.

5. Apparatus according to claim 4, characterized by the provision of an adjustable baffle mounted below said impelling means for controlling the motion imparted to said gas by said impelling means.

6. In apparatus of the class described, a double-walled housing, means for passing a current of material-laden gas through said housing in a generally helical path, means, including stationary vanes extending into the path of said gas, for diverting the outer peripheral strata of said gas to the space between the walls of said housing, a second housing, and means for passing the remainder of said gas through said second housing in a generally helical path, removing a preponderance of the solid material from said gas in said second housing, and returning said gas to said first housing, the parts being so constructed and arranged that the portion of said material-laden gas diverted to the space between the walls of said first housing is discharged downwardly into said returning current of relatively clean gas.

7. Apparatus according to claim 6, in which said second housing is provided with double walls and means, including stationary vanes for diverting the outer peripheral strata of gas within said second housing into the space between said walls.

8. In apparatus for separating solid material from suspension in a gas, a housing, a second housing surrounding said first housing and spaced therefrom, means for passing the material laden gas upwardly through said first housing in a generally helical path and downwardly in the space between said housings in a generally helical path, a constricted chamber associated with said first housing, stationary means extending into the path of the gas for diverting the outer peripheral strata of said gas into said constricted chamber, a constricted chamber associated with said second housing, and stationary means extending into the path of the gas for diverting the outer peripheral strata of the remaining gas into said second constricted chamber.

9. In apparatus for separating solid material from suspension in a gas, a housing, a second housing surrounding said first housing and spaced therefrom, means for passing the material laden gas upwardly through said first housing in a generally helical path and downwardly in the space between said housings in a generally helical path, a constricted chamber associated with said first housing, stationary means extending into the path of the gas for diverting the outer peripheral strata of said gas into said constricted chamber, a constricted chamber associated with said second housing, stationary means extending into the path of the gas for diverting the outer peripheral strata of the remaining gas into said second constricted chamber, and means for retarding the flow of the gas as it passes out of said second constricted chamber.

THEO SCHMIDT.